United States Patent
Khare et al.

(10) Patent No.: US 6,819,660 B2
(45) Date of Patent: Nov. 16, 2004

(54) METHOD AND APPARATUS FOR DETERMINING OPTIMUM DATA RATE ON THE REVERSE SUPPLEMENTAL CHANNEL IN WIRELESS COMMUNICATIONS

(75) Inventors: Arjun Khare, San Diego, CA (US); Tynghuei Lou, San Diego, CA (US)

(73) Assignee: Qualcomm Inc, San Diego, CA (US)

( * ) Notice: Subject to any disclaimer, the term of this patent is extended or adjusted under 35 U.S.C. 154(b) by 845 days.

(21) Appl. No.: 09/798,370

(22) Filed: Mar. 2, 2001

(65) Prior Publication Data
US 2002/0064145 A1 May 30, 2002

Related U.S. Application Data
(60) Provisional application No. 60/250,335, filed on Nov. 30, 2000.

(51) Int. Cl.[7] .............................................. H04B 7/216
(52) U.S. Cl. ....................... 370/342; 370/474; 370/479; 455/423
(58) Field of Search ................................ 370/310, 313, 370/342, 345, 349, 464, 474, 475, 476, 479; 455/400, 422, 423, 424, 425

(56) References Cited

U.S. PATENT DOCUMENTS

| | | | | |
|---|---|---|---|---|
| 6,137,789 A | * | 10/2000 | Honkasalo | 370/342 |
| 6,414,938 B1 | * | 7/2002 | Corke et al. | 370/231 |
| 6,510,148 B1 | * | 1/2003 | Honkasalo | 370/342 |
| 6,526,030 B2 | * | 2/2003 | Rezaiifar et al. | 370/335 |
| 6,621,809 B1 | * | 9/2003 | Lee et al. | 370/335 |
| 6,704,328 B1 | * | 3/2004 | Khaleghi et al. | 370/468 |
| 6,728,218 B1 | * | 4/2004 | Corke et al. | 370/252 |
| 6,751,199 B1 | * | 6/2004 | Sindhushayana et al. | 370/252 |

FOREIGN PATENT DOCUMENTS

| | | |
|---|---|---|
| EP | 1043908 | 10/2000 |
| WO | 9914975 | 3/1999 |
| WO | 0069197 | 11/2000 |

OTHER PUBLICATIONS

Nanda, et al., *Adaptation Techniques in Wireless Packet Data Services*; IEEE Communication Magazine (2000).

* cited by examiner

Primary Examiner—Hassan Kizou
Assistant Examiner—Dmitry Levitan
(74) Attorney, Agent, or Firm—Philip R Wadsworth; Charles D Brown; George C Pappas

(57) ABSTRACT

In one disclosed embodiment, a mobile unit receives an assigned reverse supplemental channel data rate, for example, as part of a supplemental channel assignment from a base station to the mobile unit in a cdma spread spectrum communication system. The mobile unit utilizes a profiling table to determine a maximum feasible reverse supplemental channel data rate corresponding to a given forward supplemental channel data rate. For example, the profiling table can be constructed by testing the mobile unit to determine what combinations of forward and reverse supplemental channel data rates and operating conditions cause the mobile unit's processor to "crash". The mobile unit communicates data over the reverse supplemental channel at a data rate which does not exceed the maximum feasible reverse supplemental channel data rate, for example, by constructing service data units using filler to lower the communication data rate below the maximum feasible reverse supplemental channel data rate.

35 Claims, 5 Drawing Sheets

METHOD AND APPARATUS FOR DETERMINING OPTIMUM DATA RATE ON THE REVERSE SUPPLEMENTAL CHANNEL IN WIRELESS COMMUNICATIONS

The present application claims the benefit of a pending provisional patent application entitled "Method for Self-Throttling The Data Rate on the Reverse Supplemental Channel in a Wireless Communication System" invented by Arjun Khare and Tynghuei Lou, Ser. No. 60/250,335 filed on Nov. 30, 2000.

BACKGROUND OF THE INVENTION

1. Field of the Invention

The present invention generally relates to the field of wireless communication systems. More specifically, the invention relates to supplemental channel assignments in code division multiple access communication systems.

2. Related Art

In wireless communication systems, such as code division multiple access ("CDMA") system, communication generally takes place between a mobile unit and a base station. Communication occurs over communication paths called channels. For example, a channel may be provided by radio frequency ("RF") signal propagation between a base station antenna and a mobile unit antenna. In CDMA systems each user uniquely encodes its message signal into a transmission signal in order to separate the message signal from those of other users sharing a channel. Several different techniques and methods of coding are used for encoding and decoding the information in transmission signals. For example, some commonly used coding methods, also referred to as "spreading codes", are Walsh functions (also referred to as "orthogonal spreading codes") and pseudo-random noise codes, also called a PN (pseudo-noise) codes. The intended receiver, knowing the code sequences of the user, can decode the transmission signal to receive the message. The encoding of the message signal spreads its spectrum so that the bandwidth of the encoded transmission signal is much greater than the original bandwidth of the message signal. For this reason CDMA is also referred to as "spread spectrum" modulation or coding.

Communication channels are further characterized, for example, according to function. A forward channel, for example, refers to a channel used for communications from the base station to a mobile unit, and a reverse channel refers to a channel used for communications from a mobile unit to the base station. A fundamental channel is established whenever communication is initiated between a base station and a mobile unit, for example, if a user makes a phone call. A fundamental channel is a channel used for carrying a combination of user data, signaling information, and power control information. A fundamental channel can include both a forward fundamental channel and a reverse fundamental channel.

A supplemental channel is a channel that may optionally be provided in addition to a fundamental channel and which operates in conjunction with the fundamental channel to provide higher data rate services. Provision of a supplemental channel is also referred to as "assignment" of the supplemental channel. Supplemental channel assignments are made by the base station, and not by the mobile unit, in a cdma2000 system. A supplemental channel may include a forward supplemental channel or a reverse supplemental channel or both. A supplemental channel is used for communicating user data, but not for signaling information, i.e. information used by the communication system, for example, to control the flow of traffic. Thus, communication between a base station and a mobile unit entails establishment of one forward fundamental channel, one reverse fundamental channels and, optionally, the assignment of one or more supplemental channels. The specifications for various types of communication channels in a cdma2000 system may be found in the cdma2000 standards, in particular, the standard published as *TIA/EIA/IS*-2000-5, *Upper Layer* (*Layer* 3) *Signaling Standard for cdma*2000 *Spread Spectrum Systems*.

FIG. 1 illustrates an example of channel assignments by a base station to a mobile unit in an exemplary CDMA wireless communication system. Exemplary communication system 100 shown in FIG. 1 comprises part of a cdma2000 spread spectrum communication system. As shown in FIG. 1, base station 102 communicates with mobile unit 112 over a communication channel provided by RF signal propagation between base station antenna 104 connected to base station 102 and mobile unit antenna 111 connected to mobile unit 112. Mobile unit 112 may optionally be connected to a computer, such as a personal computer, for example, PC 114. PC 114 can be connected to mobile unit 112 by serial cable 113, for example.

The communication channel includes fundamental channel 106, which includes both a forward and reverse fundamental channel, indicated in FIG. 1 by an arrow which points in both the forward and reverse directions. As described above, fundamental channel 106 can be used for carrying a combination of user data, signaling information, and power control information. The communication channel further includes forward supplemental channel 108, indicated in FIG. 1 by an arrow which points in the forward direction from base station 102 to mobile unit 112. The communication channel also includes reverse supplemental channel 110, indicated in FIG. 1 by an arrow which points in the reverse direction from mobile unit 112 to base station 102. As described above, forward supplemental channel 108 and reverse supplemental channel 110 can be used for carrying user data, indicated in FIG. 1 by the notation "Data" in forward supplemental channel 108 and the same notation in reverse supplemental channel 110.

As seen in FIG. 1, the notation "ESCAM, UHDM, SCRM, Data" in fundamental channel 106 indicates types of information which may be carried by fundamental channel 106. Data refers to user data information and other non-specified information which may be carried by the channel. ESCAM ("Extended Supplemental Channel Assignment Message") and UHDM ("Universal Handoff Direction Message") are prescribed forms of communication which the base station can transmit to the mobile unit to make assignments of supplemental channels to a mobile unit. The ESCAM and UHDM contain necessary information for the establishment and assignment of a supplemental channel to a mobile unit, for example, the data rate that will be used on a particular supplemental channel. SCRM ("Supplemental Channel Request Message") is a prescribed form of communication which a mobile unit can transmit to the base station to request from the base station various actions regarding supplemental channels. For example, a mobile unit may request a supplemental channel to be assigned or an assigned supplemental channel to be canceled, , or may request a supplemental channel with a particular data rate to be assigned. In general, the base station tries to accommodate as many mobile units as possible, and therefore the base station has control over supplemental channel assignments. Thus, FIG. 1 shows one example of channel assignments by a base station to a mobile unit in an exemplary cdma2000 spread spectrum communication system.

One scenario which commonly occurs is that a mobile unit may receive a supplemental channel assignment with a reverse supplemental channel data rate that is too high for the mobile unit processor. In such a situation the mobile unit may not be capable of processing and sending data on the reverse supplemental channel at the required assigned data rate, and therefore the mobile unit may "crash", or reset and lose the call, or exhibit other undesirable behavior. There are a number of possible responses for the mobile unit to try to adapt to the situation. For example, the mobile unit can operate in discontinuous transmission mode ("DTX"). In DTX mode the mobile unit switches its transmitter off on the reverse supplemental channel autonomously. The base station recognizes that the mobile unit is operating in DTX mode, so the call is not lost, however there is a waste of system resources because, for example, the assigned reverse supplemental channel is not being used and data transmission from the mobile unit is being interrupted.

As another example, the mobile can send a SCRM requesting a lower reverse supplemental channel data rate. The base station requires a certain amount of time to respond to such a request, may take as much time as it needs for response, and may, in conformance with the cdma2000 standard, even ignore the request. In conformance with the cdma2000 standard, the mobile unit continues transmitting on the assigned reverse supplemental channel at the high data rate until a reverse supplemental channel reassignment is received from the base station. Thus, the mobile unit can still crash while attempting to adapt to the situation by requesting a lower reverse supplemental channel data rate.

Thus, there is a need in the art for a mobile unit to adapt to a situation in which the mobile unit has received from a base station in a spread spectrum system a reverse supplemental channel assignment with a reverse supplemental channel data rate that is too high for the mobile unit processor's capabilities. There is also need in the art for a mobile unit in a spread spectrum system, in a situation in which the mobile unit has received from a base station a supplemental channel assignment with a reverse supplemental channel data rate that is too high for the mobile unit processor's capabilities to adapt to the situation without being wasteful of mobile unit or system resources.

SUMMARY OF THE INVENTION

The present invention is directed to method and apparatus for determining optimum data rate on the reverse supplemental channel in wireless communications. The invention overcomes the need in the art for a mobile unit to adapt to a situation in which the mobile unit has received from a base station in a spread spectrum system a reverse supplemental channel assignment with a reverse supplemental channel data rate that is too high for the mobile unit processor's capabilities. Moreover, the invention provides an adaptation for a mobile unit in a spread spectrum system, in a situation in which the mobile unit has received from a base station a supplemental channel assignment with a reverse supplemental channel data rate that is too high for the mobile unit processor's capabilities, that avoids wasting either mobile unit or system resources.

In one aspect of the invention, a mobile unit receives an assigned reverse supplemental channel data rate. For example, the assigned reverse supplemental channel data rate can be part of a supplemental channel assignment from a base station to the mobile unit in a cdma2000 spread spectrum communication system. The mobile unit utilizes a profiling table to determine a maximum feasible reverse supplemental channel data rate corresponding to a given forward supplemental channel data rate. For example, the profiling table can be constructed by testing the mobile unit to determine what combinations of forward and reverse supplemental channel data rates and operating conditions cause the mobile unit's processor to "crash". The mobile unit communicates data over the reverse supplemental channel at a data rate which does not exceed the maximum feasible reverse supplemental channel data rate. For example, the mobile unit can construct service data units using filler to lower the communication data rate below the maximum feasible reverse supplemental channel data rate.

DETAILED DESCRIPTION OF THE PREFERRED EMBODIMENTS

The presently disclosed embodiments are directed to method and apparatus for determining optimum data rate on the reverse supplemental channel in wireless communications. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1:
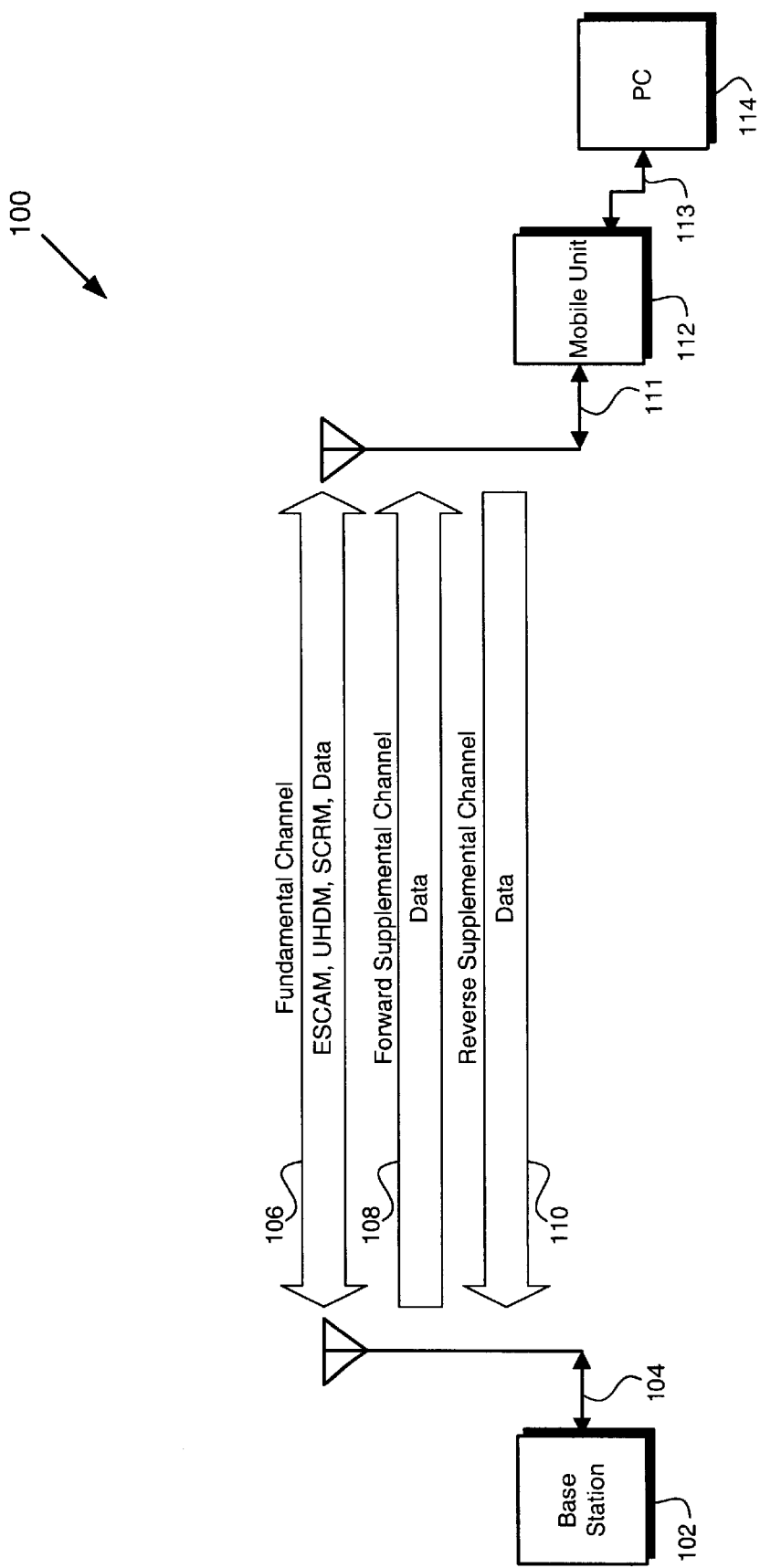
FIG. 1 illustrates, in block diagram form, an example of channel assignments by a base station to a mobile unit in an exemplary CDMA wireless communication system.
Figure 2:
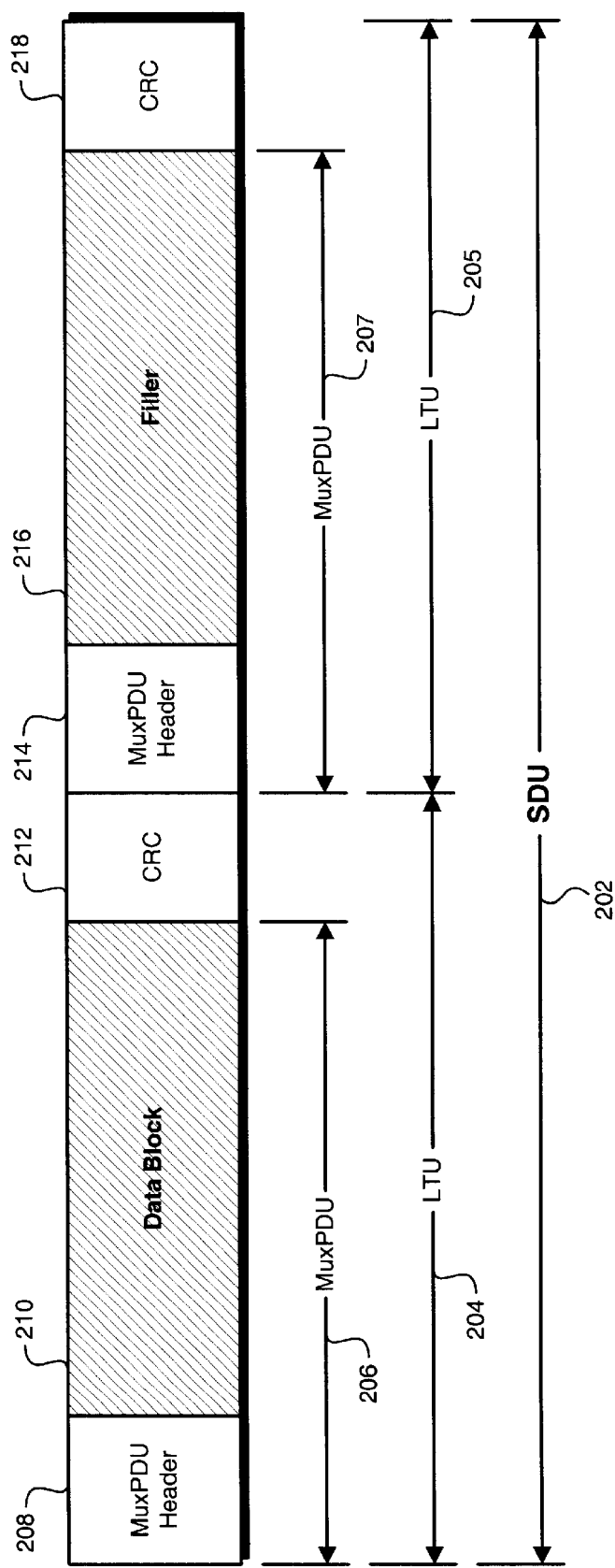
FIG. 2 illustrates an exemplary convolutionally coded service data unit ("SDU") constructed by a mobile unit in accordance with one embodiment of the present invention in a CDMA wireless communication system.

FIG. 2 illustrates an exemplary convolutionally coded service data unit ("SDU") constructed in accordance with one embodiment by a mobile unit in a cdma2000 spread spectrum system. It is noted that a "mobile unit" is an example of what is referred to generally as a "wireless communication device" in the present application. Exemplary SDU 202 shown in FIG. 2 constitutes part of communications from a mobile unit to a base station, for example, when communication is taking place over a reverse supplemental channel in a CDMA wireless communication system, such as a cdma2000 system. The mobile unit may be a phone or a CDMA modem, for example, in a CDMA wireless communication system, such as a cdma2000 system.

The present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention.

Continuing with FIG. 2, SDU 202 comprises part of a logical framework for the transmission of data in a cdma2000 system. Transmission of data using SDU 202 follows part of an overall scheme for organizing communication in layers. Communication within and between layers takes place only via certain well-defined encapsulated data units in order to ensure organized communication within a communication system, such as a CDMA wireless communication system. In a cdma2000 communication system, a service data unit, of which SDU 202 is an example, is one such well-defined encapsulated data unit. The specifications for SDUs may be found in the cdma2000 standards published as *TIA/EIA/IS*-2000-3, *Medium Access Control (MAC) Standard for cdma2000 Spread Spectrum Systems* and *TIA/EIA/IS*-2000-5, *Upper Layer (Layer 3) Signaling Standard for cdma2000 Spread Spectrum Systems*.

As seen in FIG. 2, SDU 202 is a set of data, header information, and control information which, for a convolutionally coded SDU, includes logical transmission units ("LTU") 204 and 205. The number of LTUs included in an SDU depends on the rate of data transmission and is specified in the *TIA/EIA/IS*-2000-3 standard. Each LTU includes one or more Multiplex Sublayer Protocol Data Units ("MuxPDUs") and a 16 bit CRC. A CRC ("Cyclic Redundancy Code") is a method for detecting and correcting errors in data transmission and is commonly used in communication systems. Thus, LTU 204 includes MuxPDU 206 and 16 bit CRC 212, and LTU 205 includes MuxPDU 207 and 16 bit CRC 218. Each MuxPDU includes data, which can be user data, and header information combined in accordance with certain rules which specify, for example, available data rates for the physical channel, such as the fundamental channel or supplemental channel. Thus, Mux-PDU 206 includes MuxPDU header 208 and user data block 210. Either of MuxPDU 206 or MuxPDU 207 may be a Fill MuxPDU, with the added restriction that once a Fill Mux PDU has been included in an SDU, then all remaining MuxPDUs are to be Fill MuxPDUs. A Fill MuxPDU is a certain type of MuxPDU that is not associated with any service, and is used as filler when assembling a supplemental channel SDU. MuxPDU 207 is shown in FIG. 2 as a Fill MuxPDU, thus, MuxPDU 207 includes MuxPDU header 214 and filler 216. The specifications for LTU, PDU, MuxPDU, and Fill MuxPDU are given in the above-referenced published standards.

Communication of data from a mobile unit using an SDU proceeds with the mobile unit partitioning the data into the correct size data blocks, providing header information, for example, for the MuxPDU headers, calculating the CRC bits, and constructing an SDU, such as SDU 202 shown in FIG. 2, by forming the information into a sequence. As noted above, the number of MuxPDUs included in an SDU varies in a prescribed way, according to the cdma2000 standard, depending on the supplemental channel data rate. Supplemental channel data rates are integral multiples of a basic rate, which depends on the rate set being used. For example, using the rate set referred to as "rate set 1", supplemental channel data rates are denoted by 1×, 2×, 4×, 8×, and 16×, and each rate is an integral multiple of 9.6 Kbps. So for example, 1× denotes a data rate of 9.6 Kbps, 2× denotes 19.2 Kbps, and so forth, 16× denotes 153.6 Kbps. For example, assuming double-size MUX PDU's are being used, a 16× SDU includes 8 MuxPDUs, and an 8× SDU includes 4 MuxPDUs. If single-size MUX PDU's are used, then an 8× SDU includes 4 MuxPDU's. A 16× SDU always has double-size MUX PDU's, and so always has 8 Mux PDUs. Thus, although FIG. 2 shows exemplary SDU 202 including two MuxPDUs, an SDU can have fewer than two MuxPDUs or more than two MuxPDUs. The number of MuxPDUs included in the SDU is determined in advance, then, depending on the assigned reverse supplemental channel data rate, and a complete SDU is constructed regardless of whether there is enough data to be transmitted to fill the number of MuxPDUs included in the SDU for the assigned data rate. If there is too much data for one SDU, then additional SDUs can be constructed until the remaining data is transmitted. If at some point there is not enough remaining data to fill a complete SDU, only the number of MuxPDUs required to accommodate the amount of remaining data are formed and the remainder of the SDU is formed from Fill MuxPDUs.

In one embodiment, SDUs are only partially filled with data even though there is enough remaining data to be transmitted to fill a complete SDU, and the remainder of the SDU is formed from Fill MuxPDUs. For example, SDU 202 shown in FIG. 2 is constructed by filling MuxPDU 206 with data and then completing construction of SDU 202 using a Fill MuxPDU for MuxPDU 207. The relative numbers of MuxPDUs containing data and Fill MuxPDUs used to construct an SDU are specified based on the forward and reverse channel assignments made by the base station and a profiling table resident in the mobile unit. Fill MuxPDUs require less processing than MuxPDUs containing data, thus an SDU constructed according to one embodiment can be constructed in less time, and with less mobile unit processor resource utilization, i.e. CPU time, than a conventionally constructed SDU, i.e. one in which every available Mux-PDU is used for transmitting data. By using Fill MuxPDUs the mobile unit can communicate user data at a communication data rate that is lower than the assigned reverse supplemental channel data rate. Thus, FIG. 2 describes exemplary SDU 202, constructed in accordance with one embodiment, in a cdma2000 wireless communication system.

Figure 3:
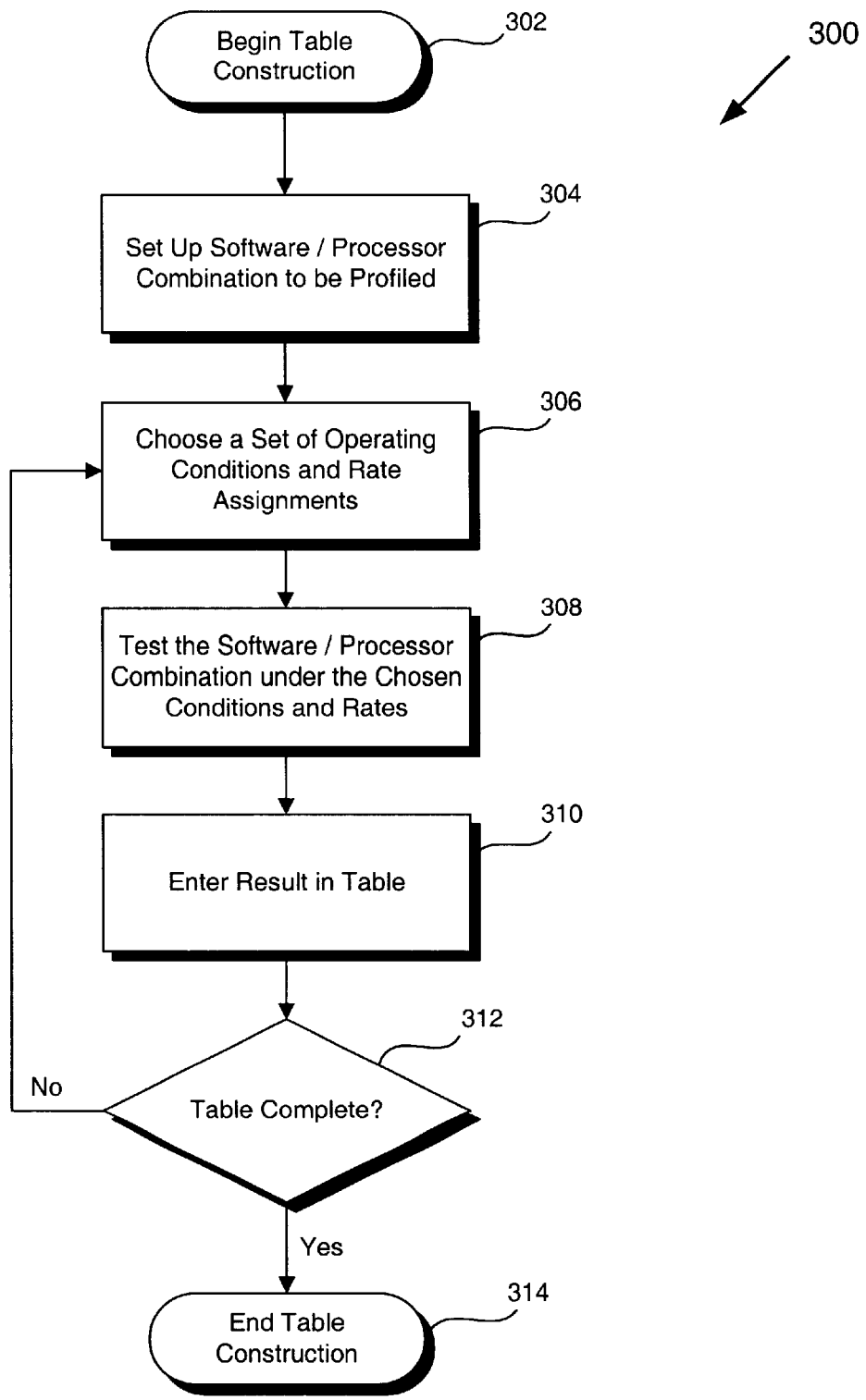
FIG. 3 is a flow chart illustrating steps for making a profiling table for supplemental channel assignments in accordance with one embodiment of the present invention.

FIG. 3 shows flow chart 300 describing one example of making a profiling table for supplemental channel assignments in accordance with one embodiment. Flowchart 300 shown in FIG. 3 describes a process which can be performed in a laboratory or any other suitable environment for testing and measuring the operation of subsystems which may generally reside in a mobile unit.

Referring to FIG. 3, at step 302 the invention's process for making a profiling table for reverse supplemental channel assignments, also referred to as "profiling", begins. Profiling might be initiated, for example, by the use or contemplated use of a new type of processor chip, or chip family, in a mobile unit. As another example, profiling might be initiated by a software update or use of a new version of software in a mobile unit. Also, for example, profiling may be initiated if a supplier of mobile units wishes to add custom software to a mobile unit which affects the operation of the software being used by the mobile unit.

At step 304, the profiling process is initiated by setting up the processor and the software which is to be used in the mobile unit in a such a way that actual operating conditions can be simulated. For example, a mobile unit containing the processor and software to be tested could be set up to actually transmit and receive test communications with a base station, with appropriate measurement equipment connected to the mobile unit. As another example, the processor and software to be tested could be set up on a test bench with signal generators configured to simulate all relevant operating conditions, with appropriate measurement equipment connected to the processor.

Continuing with FIG. 3, at step 306, a particular configuration of operating conditions is chosen along with some particular combination of forward and reverse supplemental channel data rate assignments or appropriate simulation of the particular forward and reverse supplemental channel data rate assignments. For example, if the processor has different operating modes which affect the operation of the processor at different reverse supplemental channel data rate assignments, such as internal RAM turned on or off, one of those modes can be chosen. Then, continuing with the example, a particular assignment of supplemental channel data rates is chosen. For example, a 16x forward supplemental channel data rate with reverse supplemental channel data rate assignment of 8x may be chosen. Thus, at step 306, a particular test configuration, i.e. a set of operating conditions along with a combination of forward and reverse supplemental channel data rate assignments, is chosen. As the process of making the profiling table progresses, each test configuration that is relevant for completing the profiling table can systematically be chosen, so that all relevant test configurations are eventually tested. For example, a list of all relevant test configurations can be enumerated in advance, and the list can be stepped through as testing proceeds, until the entire list is tested.

At step 308 of flowchart 300, the particular test configuration chosen at step 306 is operated and the measurement results are noted. For example, suppose that a profiling table is to made that accounts for the operating condition of whether internal RAM is turned on or off. Internal RAM is a feature of some processors which allows the processor to operate considerably faster when the internal RAM feature is enabled, i.e. turned on. Therefore, enabling or disabling the internal RAM feature can alter the results of the test. Thus, one particular test configuration could be composed of operating the processor with internal RAM turned on, a forward supplemental channel data rate of 16x and a reverse supplemental channel data rate of 16x.

For this particular combination of operating conditions and data rate assignments, i.e. test configuration, the particular processor and software combination being tested may be judged to be overloaded and likely to "crash", i.e. malfunction.

For example, the judgement may be made based on "sleep time" for the processor, which is a percentage of the time that the software can operate in an idle mode on the processor, and thus represents availability of unused processing resources. For example, a "sleep time" in the range of approximately 10% to 20% can be considered to be indicative of an overloaded processor. Using a criterion of 10% "sleep time" in the present example, if the processor operated with less than 10% "sleep time", then the combination of a 16x reverse supplemental channel data rate with a 16x forward supplemental channel data rate would be deemed unsuitable for the software and processor being tested. Using the same 10% "sleep time" criterion and continuing the present example, if the processor operated with more than 10% "sleep time", at a combination of an 8x reverse supplemental channel data rate with a 16x forward supplemental channel data rate, then an 8x reverse supplemental channel data rate would be deemed suitable for use with a 16x forward supplemental channel data rate for the software and processor being tested.

Other criteria besides "sleep time" can be used; for example, the test configuration can simply be run for a certain length of time and observed for malfunctions to determine whether the given test configuration is likely to cause the particular processor and software combination being tested to be overloaded or to "crash". The details of determining appropriate test criteria for particular processor and software combinations are apparent to a person of ordinary skill in the art, and are, therefore, not presented here.

In the present example, the processor being tested supports operating conditions of internal RAM being enabled or disabled which affects the results of the testing. The profiling table can reflect the effect of the internal RAM operating conditions by providing an alternate entry for each condition at each forward supplemental channel data rate assignment. In other words, the profiling table can provide two entries for each forward supplemental channel data rate, one for internal RAM turned on and one for internal RAM turned off. For example, for the 16x forward supplemental channel data rate, if a reverse supplemental channel data rate of 8x is suitable with internal RAM turned on, and a reverse supplemental channel data rate of only 4x is suitable with internal RAM turned off, then the profiling table contains the two reverse supplemental channel data rate entries 8x and 4x, respectively, for the 16x forward supplemental channel data rate with internal RAM turned on and for the 16x forward supplemental channel data rate with internal RAM turned off.

Conversely, if the processor does not support the internal RAM feature or, for example, if the internal RAM feature makes no difference to the testing results or the internal RAM feature is not used for whatever reason, the profiling table need not reflect the effect of the internal RAM operating conditions, and the profiling table can have just one entry for each forward supplemental channel data rate assignment. Similarly, other conditions may or may not be reflected in the profiling table, in any combination or number. For example, another condition that can affect test results is the use of the relay model or the network model. Briefly, when the mobile unit is connected to a PC, for example, the mobile unit communicates data back and forth between the PC and the base station of the communication system. In the relay model, the mobile unit does no processing other than that required for communication of the data. In the network model, the mobile unit may be required to perform some additional processing to the data other than that required for communication of the data.

Thus, in general, the network model causes the mobile unit processor to run more "slowly" (on account of performing additional tasks), and therefore, affects the test results. Then, for example, a mobile unit which is to be operated in either the relay model or network model can require a profiling table with entries for each type of model, i.e. two entries, at each forward supplemental channel data rate assignment. As another example, a mobile unit which operates either with or without internal RAM and with either the relay model or network model can require a profiling table with four entries at each forward supplemental channel data rate assignment.

At step 310 of flowchart 300, the results from testing step 308 are entered in the profiling table. Continuing with the above example, in which the combination of a 16× reverse supplemental channel data rate with a 16× forward supplemental channel data rate is deemed unsuitable for the software and processor being tested and in which the combination of an 8× reverse supplemental channel data rate with a 16× forward supplemental channel data rate is deemed suitable for the software and processor being tested, a profiling table entry is recorded as 8× for the 16× forward supplemental channel data rate.

Thus, each profiling table entry represents the maximum feasible reverse supplemental channel data rate that the combination of software and processor being tested can reliably process for a given forward supplemental channel data rate assigned by the base station. In addition, the profiling table may contain other useful information which can be added either during testing or later, for example, upon completion of the testing. For example, the maximum feasible number of MuxPDUs to included in an SDU for each reverse supplemental channel data rate can be included in the profiling table along with each reverse supplemental channel data rate.

At step 312, the process determines whether the profiling table is complete. For example, the profiling table may be determined to be complete based on whether a test has been made of each possible test configuration of channel assignments and operating conditions which affect the results of the test. If a list of all relevant test configurations has been enumerated in advance, and the list has been stepped through as testing proceeds, as described above, the profiling table may be determined to be complete if the end of the list has been reached, i.e. the entire list has been tested.

Thus, the testing produces a determination of the maximum feasible reverse supplemental channel data rate for each relevant operating condition and forward supplemental channel assignment, and the results are recorded in a profiling table. When the process determines that the profiling table is not complete, the process proceeds by returning to step 306 and continuing with a new test configuration. When the process determines that the profiling table is complete, the process proceeds to step 314.

At step 314, the process of making a profiling table ends. In general, each profiling table is applicable to the particular type, also referred to as "chip family" or "processor type", of the chip which has been tested and the combination of software which has been tested with that chip. The profiling table can be stored in a non-volatile memory, such as flash memory, in the mobile unit for use by the mobile unit processor. For example, the profiling table can be downloaded with software to the mobile unit when the mobile unit is configured for operation. Thus, FIG. 3 illustrates an example process for making a profiling table for reverse supplemental channel assignments in accordance with one embodiment.

Figure 4:
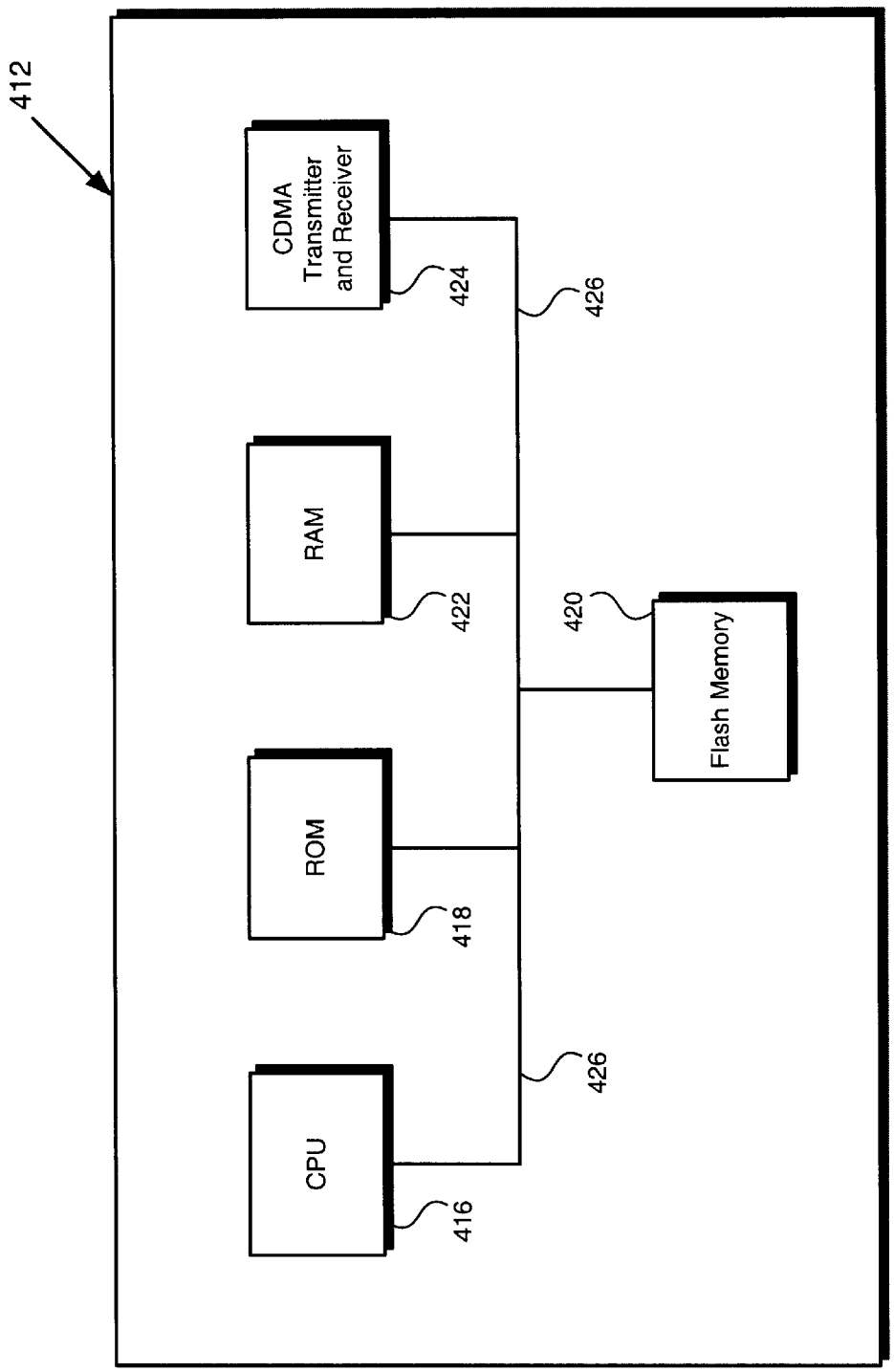
FIG. 4 is a block diagram illustrating an example processor implementation in accordance with one embodiment of the present invention for an exemplary mobile unit in a CDMA wireless communication system.

FIG. 4 illustrates an exemplary implementation of mobile unit processor 412 in accordance with one embodiment for a mobile unit in an exemplary cdma2000 system. A representative hardware environment of mobile unit processor 412, where the present invention can be practiced, is depicted in FIG. 4. The mobile unit processing environment of FIG. 4 includes Central Processing Unit (CPU) 416, Read Only Memory (ROM) 418, flash memory 420, Random Access Memory (RAM) 422, and CDMA transmitter and receiver 424. The mobile unit processing environment of FIG. 4 may also include other modules and features, such as a vocoder, dialing keypad, and display, which are not shown in FIG. 4, for the sake of brevity and conciseness. Mobile unit processor 412 shown in FIG. 4 communicates through CDMA transmitter and receiver 424 with a base station in a CDMA wireless communication system, such as a cdma2000 system.

Continuing with FIG. 4, bus 426 couples CPU 416, ROM 418 memory module, flash memory 420 memory module, RAM 422 memory module, and CDMA transmitter and receiver 424 as shown in FIG. 4. Mobile unit processor 412 shown in FIG. 4 typically has resident software, for example, an operating system type of program, which manages the communications with the CDMA system, allocates the resources of the mobile processing unit, and manages various inputs and outputs of the system, such as reading from ROM 418 or flash memory 420 and reading from or writing to RAM 422. It is understood and appreciated by those skilled in the art that the present invention may also be implemented on platforms and using operating system software other than those mentioned here and shown in FIG. 4.

In one embodiment described here, a profiling table for supplemental channel assignments is stored in flash memory 420. A procedure which utilizes the profiling table for supplemental channel assignments for communication using supplemental channels in a cdma2000 system is performed by mobile unit processor 412, for example, by table utilization software which is resident in mobile unit processor 412. For example, table utilization software may be stored in flash memory 420 along with the profiling table and loaded into RAM 422 prior to execution. The table utilization software is run by CPU 416 in conjunction with the operating system type of software also run by CPU 416. The procedure which utilizes the profiling table prevents "crashing" or other undesirable behavior of mobile unit processor 412, such as resetting of the mobile unit or call termination, caused by inability of mobile unit processor 412 to "keep up" with the data rate of communications under certain conditions of supplemental channel assignments made by the base station in the cdma2000 spread spectrum communication system.

Figure 5:
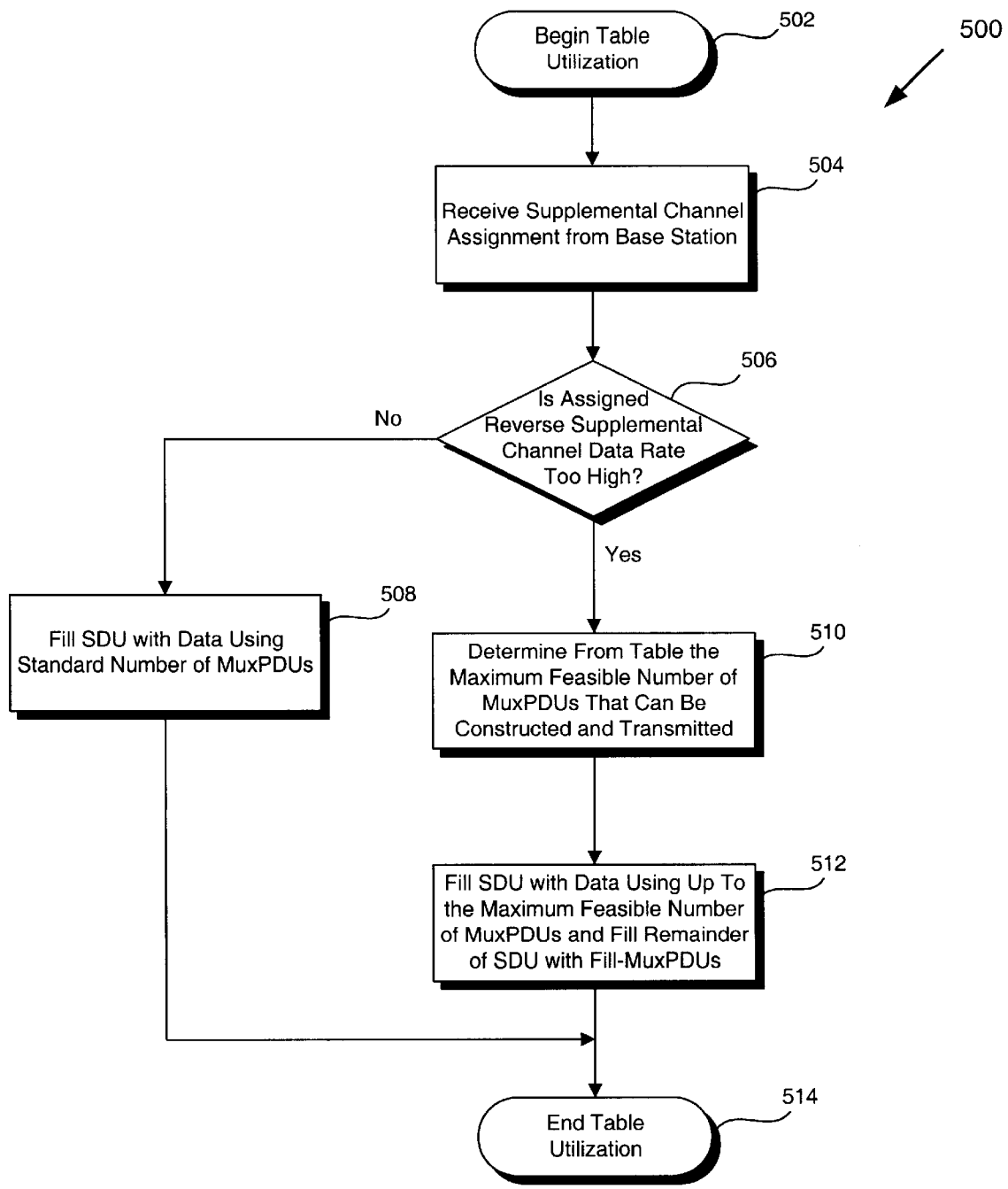
FIG. 5 is a flow chart illustrating the steps for using a profiling table for supplemental channel assignment in accordance with one embodiment of the present invention.

FIG. 5 is a flow chart illustrating steps for using a profiling table for supplemental channel assignments for communication using supplemental channels in a cdma2000 system in accordance with one embodiment. Flowchart 500 shown in FIG. 5 describes a procedure for utilization of a profiling table for supplemental channel assignments, also referred to as "table utilization" procedure. The table utilization procedure can be performed in a mobile unit when communication is taking place using supplemental channels assigned by a base station in a CDMA wireless communication system. The process shown in flowchart 500 can be performed in a mobile unit, for example, in a cdma2000 spread spectrum communication system.

Referring to FIG. 5, at step 502 the invention's table utilization procedure begins. At step 504 the table utilization procedure is initiated by receiving a supplemental channel assignment from a base station in a cdma2000 system. For example, a forward and reverse supplemental channel assignment may sent by the base station using an ESCAM or UHDM signaling message in a cdma2000 system to the mobile unit. The signaling message contains information relevant to the table utilization procedure, i.e. information which can be used to determine the assigned forward and reverse supplemental channel data rates, which is passed to the mobile unit processor.

Continuing with FIG. 5, at step 506 the table utilization procedure determines whether the reverse supplemental channel data rate is too high for the given forward supplemental channel data rate. The mobile unit processor "knows" the status of all relevant operating conditions on which the profiling table is based, such as whether internal RAM is turned on or off, or whether a relay or network model is being used, for example. Using the operating condition status information and the forward and reverse supplemental channel data rates, the table utilization procedure finds the corresponding reverse supplemental channel data rate by looking up the operating condition and the supplemental channel data rates in the profiling table. For example, if the profiling table depends simply on the assigned forward supplemental channel data rate, the table utilization procedure matches the assigned forward supplemental channel data rate to the forward supplemental channel data rate in the profiling table and reads the corresponding reverse supplemental channel data rate from the profiling table. The table utilization procedure then compares the assigned reverse supplemental channel data rate with the reverse supplemental channel data rate from the profiling table.

When the table utilization procedure determines that the assigned reverse supplemental channel data rate is greater than the reverse supplemental channel data rate from the profiling table, i.e. the assigned reverse supplemental channel data rate is too high for the given forward supplemental channel data rate, the table utilization procedure proceeds to step 510. When the table utilization procedure determines that the assigned reverse supplemental channel data rate is lower than the reverse supplemental channel data rate from the profiling table, i.e. the assigned reverse supplemental channel data rate is within the acceptable range for the given forward supplemental channel data rate assignment, the table utilization procedure proceeds to step 508. At step 508, the table utilization procedure fills the SDU, for example, according to the applicable cdma2000 standard. The table utilization procedure then proceeds to step 514.

At step 510, the table utilization procedure uses the reverse supplemental channel data rate from the profiling table to determine the maximum feasible number of Mux-PDUs that can be filled in each SDU. The processing can be made more efficient by, for example, including in the profiling table the specific maximum feasible number of Mux-PDUs corresponding to each supplemental reverse channel data rate. The table utilization procedure then proceeds to step 512.

At step 512, the table utilization procedure accesses the data to be transmitted and begins filling MuxPDUs with the data to be transmitted. If there is enough data remaining to be transmitted, the maximum feasible number of MuxPDUs is used, otherwise some lesser number of MuxPDUs is filled and the remainder of the SDU is filled with Fill MuxPDUs. The table utilization procedure uses the assigned reverse supplemental channel data rate to determine the total number of MuxPDUs required for the SDU at the assigned reverse supplemental channel data rate. The table utilization procedure then supplies the appropriate number of Fill MuxPDUs to complete the SDU after either the maximum feasible number of MuxPDUs is filled or the number of MuxPDUs required to transmit the remaining data is filled. In other words, the table utilization procedure saves processor time by filling the SDU with at least some specific minimum amount of blank information. The specific minimum amount depends on the profiling of the processor and software combination used by the mobile unit processor and the assigned supplemental channel data rates.

At step 514, the table utilization procedure ends. Concurrent with the table utilization procedure, the mobile unit processor may be performing other tasks, such as requesting different supplemental channel data rate assignments or requesting cancellation of a supplemental channel assignment, for example. Thus, FIG. 5 describes an example table utilization procedure utilizing a profiling table for supplemental channel assignments in a cdma2000 system in accordance with one embodiment.

It is appreciated by the above description that the invention provides method and apparatus for determining optimum data rate on the reverse supplemental channel in wireless communications. According to an embodiment of the invention described above, a profiling table is constructed for reverse supplemental channel data rates in a wireless communication system, such as a cdma2000 system. Moreover, according to an embodiment of the invention described above, a procedure for utilizing the profiling table is given which enables a mobile unit to adapt its processing to maximize its data throughput without crashing or other undesirable effects regardless of supplemental channel assignments by a base station in a wireless communication system, such as a cdma2000 system. Although the invention is described as applied to communications in a cdma2000 system, it will be readily apparent to a person of ordinary skill in the art how to apply the invention in similar situations where adaptation to an assigned data rate is needed to avoid undesirable effects on communications processing. Such systems may include W-CDMA and HDR wireless communication systems.

From the above description, it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, although embodiments are described here chiefly with reference to cdma2000 spread spectrum systems, the invention can be used in any type of wireless communication system where adaptation to data rate assignments from, for example, a base station may be needed by, for example, a mobile unit in order for the mobile unit to maximize data throughput without crashing or other undesirable effects on the mobile unit. Such a wireless communication system may be, for example, W-CDMA or HDR communication system. Also, for example, the profiling table presented in an embodiment described here can be implemented in several different useful configurations as described above. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method and apparatus for determining optimum data rate on the reverse supplemental channel in wireless communications have been described.

What is claimed is:

1. A method comprising:
   receiving an assigned reverse supplemental channel data rate;
   utilizing a profiling table to determine a maximum feasible reverse supplemental channel data rate corresponding to a given forward supplemental channel data rate; and
   communicating over a reverse supplemental channel at a data rate not exceeding the maximum feasible reverse supplemental channel data rate when the maximum feasible reverse supplemental channel data rate is less than the assigned reverse supplemental channel data rate.

2. The method of claim 1, wherein the receiving step comprises receiving the assigned reverse supplemental channel data rate over a fundamental channel in a CDMA wireless communication system.

3. The method of claim 1, wherein the receiving step comprises receiving the assigned reverse supplemental channel data rate from a base station in a CDMA wireless communication system.

4. The method of claim 1, wherein the receiving step comprises a mobile unit receiving the assigned reverse supplemental channel data rate from a base station in a CDMA wireless communication system.

5. The method of claim 1, further comprising constructing the profiling table before the receiving step.

6. The method of claim 5, wherein the constructing step comprises entering into the profiling table the maximum feasible reverse supplemental channel data rate corresponding to a set of operating conditions.

7. The method of claim 6, wherein the utilizing step comprises looking up the set of operating conditions in the profiling table.

8. The method of claim 1, wherein the communicating step comprises constructing an SDU.

9. The method of claim 8, wherein constructing the SDU comprises filling a MuxPDU with the data and completing the SDU using the MuxPDU and a Fill MuxPDU.

10. The method of claim 9, wherein the communicating step comprises transmitting the SDU.

11. A method comprising:
building a profiling table;
storing the profiling table in a mobile unit;
assigning a first supplemental channel data rate to the mobile unit;
utilizing the profiling table to determine a maximum feasible reverse supplemental channel data rate corresponding to a given forward supplemental channel data rate; and
filling a service data unit with a user data and a filler so as to communicate the service data unit at the first supplemental channel data rate wherein a communication data rate of the user data does not exceed the maximum feasible reverse supplemental channel data rate.

12. The method of claim 11, wherein the building step comprises testing the mobile unit at the first supplemental channel data rate.

13. The method of claim 11, wherein the building step comprises testing the mobile unit under a set of operating conditions.

14. The method of claim 12, wherein the building step comprises entering into the profiling table the maximum feasible reverse supplemental channel data rate corresponding to the given forward supplemental channel data rate.

15. The method of claim 14, wherein the utilizing step comprises looking up the given forward supplemental channel data rate.

16. The method of claim 13, wherein the building step comprises entering into the profiling table the maximum feasible reverse supplemental channel data rate corresponding to the set of operating conditions.

17. The method of claim 16, wherein the utilizing step comprises looking up the set of operating conditions in the profiling table.

18. The method of claim 11, wherein the storing step comprises loading the profiling table in a non-volatile memory.

19. The method of claim 11, wherein the assigning step comprises communicating the first supplemental channel data rate from a base station to the mobile unit over a fundamental channel in a cdma2000, W-CDMA, or HDR wireless communication system.

20. The method of claim 11, wherein the filling step comprises constructing an SDU.

21. The method of claim 20, wherein constructing the SDU comprises filling a MuxPDU with the data and completing the SDU using the MuxPDU and a Fill MuxPDU.

22. The method of claim 21, wherein the communicating step comprises transmitting the SDU.

23. An apparatus comprising:
a CDMA receiver configured to receive an assigned reverse supplemental channel data rate over a fundamental channel;
a memory module configured to store a profiling table; and
a CPU configured to utilize the profiling table to determine a maximum feasible reverse supplemental channel data rate corresponding to a given forward supplemental channel data rate, the CPU processing data for communication over the supplemental channel so as not to exceed the maximum feasible reverse supplemental channel data rate.

24. The apparatus of claim 23, further comprising a CDMA transmitter configured to transmit data over the supplemental channel.

25. The apparatus of claim 23, wherein the CDMA receiver is configured to receive the assigned reverse supplemental channel data rate from a base station over the fundamental channel in a cdma2000, W-CDMA or HDR wireless communication system.

26. The apparatus of claim 25, wherein the CPU is configured to construct an SDU according to the assigned reverse supplemental channel data rate.

27. The apparatus of claim 26, wherein the CPU is configured to fill a MuxPDU with the data and complete the SDU using the MuxPDU and a Fill MuxPDU.

28. The apparatus of claim 23, wherein the memory module is a RAM memory.

29. The apparatus of claim 23, wherein the memory module is a ROM memory.

30. The apparatus of claim 23, wherein the memory module is a flash memory.

31. A method for communicating over a supplemental channel of a wireless communication device, the method comprising:
utilizing a profiling table to determine a maximum feasible data rate on a reverse supplemental channel; and
communicating over the reverse supplemental channel at a data rate not exceeding the maximum feasible data rate when the maximum feasible data rate is less than an assigned data rate.

32. The method of claim 31, wherein the wireless communication device is a CDMA wireless communication device.

33. The method of claim 31, wherein the assigned data rate is received from a base station in a CDMA wireless communication system.

34. The method of claim 31, wherein communicating involves constructing an SDU.

35. The method of claim 34, wherein constructing the SDU comprises filling a MuxPDU with the data and completing the SDU using the MuxPDU and a Fill MuxPDU.

* * * * *